(12) United States Patent
Richardson et al.

(10) Patent No.: US 10,965,553 B2
(45) Date of Patent: Mar. 30, 2021

(54) SCALABLE UNSUPERVISED HOST CLUSTERING BASED ON NETWORK METADATA

(71) Applicant: Arbor Networks, Inc., Burlington, MA (US)

(72) Inventors: Mathew Ralph Richardson, Ann Arbor, MI (US); Lawrence Bruce Huston, III, Ann Arbor, MI (US); R. Grant Reed, Canton, MI (US)

(73) Assignee: Arbor Networks, Inc., Westford, MA (US)

( * ) Notice: Subject to any disclaimer, the term of this patent is extended or adjusted under 35 U.S.C. 154(b) by 0 days.

(21) Appl. No.: 15/999,420

(22) Filed: Aug. 20, 2018

(65) Prior Publication Data

US 2020/0099597 A1 Mar. 26, 2020

(51) Int. Cl.
| | | |
|---|---|---|
| *G06F 15/173* | (2006.01) | |
| *H04L 12/26* | (2006.01) | |
| *H04L 29/06* | (2006.01) | |
| *H04L 12/24* | (2006.01) | |

(52) U.S. Cl.
CPC ............ *H04L 43/02* (2013.01); *H04L 41/142* (2013.01); *H04L 41/16* (2013.01); *H04L 63/1458* (2013.01)

(58) Field of Classification Search
CPC ....... H04L 43/02; H04L 41/142; H04L 41/16; H04L 63/1458
USPC .......................................................... 709/224
See application file for complete search history.

(56) References Cited

U.S. PATENT DOCUMENTS

| | | | | |
|---|---|---|---|---|
| 9,900,402 | B1* | 2/2018 | Li | H04L 67/32 |
| 2013/0343668 | A1* | 12/2013 | Li | G06T 9/00 382/244 |
| 2014/0355664 | A1* | 12/2014 | Hardy | H04N 19/12 375/240.02 |
| 2015/0023170 | A1* | 1/2015 | Kakadia | H04L 41/0823 370/235 |
| 2016/0098844 | A1* | 4/2016 | Shaji | G06F 16/5838 382/156 |
| 2017/0257424 | A1* | 9/2017 | Neogi | H04L 43/16 |
| 2017/0293543 | A1* | 10/2017 | Xu | G06F 11/008 |
| 2018/0307551 | A1* | 10/2018 | Bacha | G06F 11/0751 |
| 2019/0188065 | A1* | 6/2019 | Anghel | G06N 7/005 |
| 2020/0043471 | A1* | 2/2020 | Ma | G01L 17/24 |

* cited by examiner

*Primary Examiner* — Hannah S Wang
(74) *Attorney, Agent, or Firm* — Locke Lord LLP; Scott D. Wofsy; Christopher J. Capelli

(57) ABSTRACT

A method for optimizing performance analysis of a plurality of network hosts associated with a communications network includes aggregating captured network performance data including a plurality of captured network performance metrics for a plurality of network flows. Each one of the plurality of network flows is associated with a plurality of network hosts. The aggregated captured network performance data is encoded by employing at least one data modification function. Dimensionality of the encoded captured network performance data is reduced using a neural network model. One or more reduced-dimensional clusters of the encoded captured network performance data are generated. Each of the one or more reduced-dimensional clusters is grouping one or more hosts of the plurality of network hosts based on the captured network performance metrics.

17 Claims, 4 Drawing Sheets

US 10,965,553 B2

SCALABLE UNSUPERVISED HOST CLUSTERING BASED ON NETWORK METADATA

FIELD OF THE INVENTION

Embodiments of the present invention relate generally to the field of computer networks, and specifically to scalable unsupervised host clustering based on network metadata.

BACKGROUND OF THE INVENTION

As an increasing number of applications and services are being made available over networks such as the Internet, an increasing number of content, application, and service providers are turning to technologies such as resource sharing, multi-tenant environments, and cloud computing. Such technologies can enable a user to obtain access to electronic resources through services, such as Web services, where the hardware and/or software used to support those services is dynamically scalable to meet the needs of the services at any given time. A user or customer typically will rent, lease, or otherwise pay for access to these resources, and thus does not have to purchase and maintain the hardware and/or software to provide access to these resources.

In at least some environments, a provider of these resources can be responsible for tasks such as upgrading and deploying software, as well as managing configuration information for the various resources. In some cases, errors can occur on these machines which may affect their ability to update information, deploy code, modify settings, or perform other activities with respect to the various resources. These errors are often costly for the provider of these resources.

Furthermore, networks and network devices are increasingly affected by the damages caused by various attacks, such as Denial of Service ("DoS") attacks. Therefore, the ability to cluster a plurality of network devices based on network metadata to identify anomalous host behavior is advantageous.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for optimizing performance analysis of a plurality of network hosts associated with a communications network includes aggregating captured network performance data including a plurality of captured network performance metrics for a plurality of network flows. Each one of the plurality of network flows is associated with a plurality of network hosts. The aggregated captured network performance data is encoded by employing at least one data modification function. Dimensionality of the encoded captured network performance data is reduced using a neural network model. One or more reduced-dimensional clusters of the encoded captured network performance data are generated. Each of the one or more reduced-dimensional clusters is grouping one or more hosts of the plurality of network hosts based on the captured network performance metrics.

In another aspect, a system for optimizing performance analysis of a plurality of network hosts associated with a communications network includes a processor and a memory device coupled to the processor. The memory device contains a set of instructions that, when executed by the processor, cause the processor to aggregate captured network performance data including a plurality of captured network performance metrics for a plurality of network flows. Each one of the plurality of network flows is associated with a plurality of network hosts. The set of instructions, when executed by the processor, further cause the processor to encode the aggregated captured network performance data by employing at least one data modification function and to reduce dimensionality of the encoded captured network performance data using a neural network model. The set of instructions, when executed by the processor, also cause the processor to generate one or more reduced-dimensional clusters of the encoded captured network performance data. Each of the one or more reduced-dimensional clusters groups one or more hosts of the plurality of network hosts based on the captured network performance metrics.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
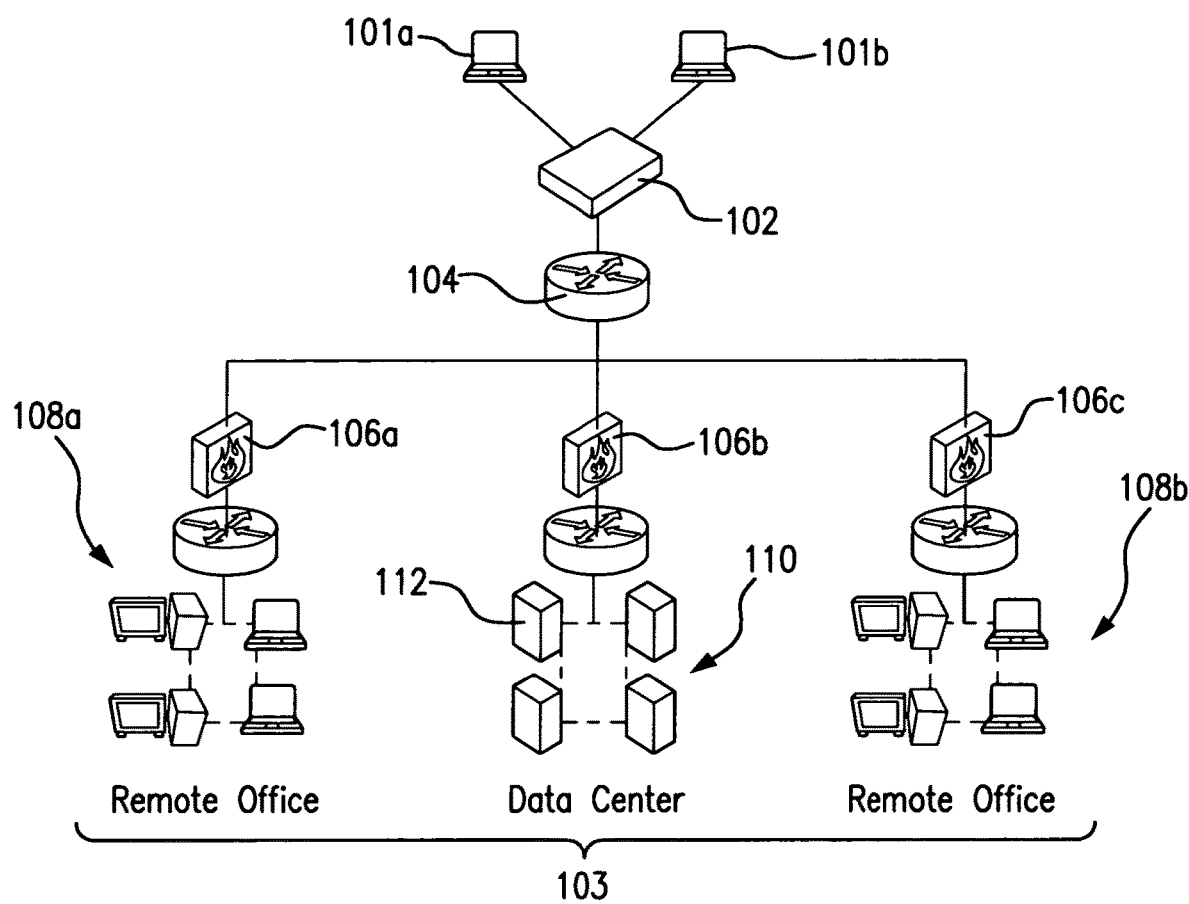
FIG. 1 is a schematic diagram showing network architecture according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Several aspects of telecommunication systems will now be presented with reference to various apparatus and methods. These apparatus and methods will be described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (OPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In accordance with an illustrated embodiment of the present invention, reference is now made to FIG. 1 which is an exemplary and non-limiting diagram illustrating a network architecture to which embodiments of the present invention are applicable. In the illustrated embodiment of FIG. 1, one or more external devices 101a, 101b communicate with a protected network 103 and specifically one or more devices (hosts) within one of the remote offices 108a, 108b and/or a server within a data center 110. In the illustrated example, communication between the external devices 101a, 101b and destination devices may be monitored by a performance optimizing device 102. The protected network 103 includes a plurality of devices/hosts to be protected from malicious threats, for example.

It is to be understood and appreciated the performance optimizing device 102 typically resides at a customer's premises but could reside elsewhere. In accordance with an illustrated embodiment of the present invention, the performance optimizing device 102 is configured to process traffic exchanged between the external devices 101a, 101b and the protected network 103 for the purpose of analyzing network performance, identifying anomalous host behavior and/or identifying groups of hosts that behave similarly, as well as, mitigating various attacks, such as DDoS attacks, intrusion attempts and malware distribution against the protected network 103. For example, the external device 101a may carry out the malicious attacks against the DNS host 112. The DNS host 112 typically receives requests that include a domain name of a website (e.g., example.com). The DNS host 112 responds to the external device 101 with the corresponding IP address (e.g. 1.1.1.1), so that the external device 101 may access the website. DNS host 112 may handle millions of requests every hour from many different external devices 101. The large volume may make detecting a DoS or DDoS attack on the DNS host 112 problematic, because it may be difficult to separate the malicious requests from the legitimate requests.

Advantageously, the embodiments disclosed herein offer a novel approach that can detect indicators of anomalous host events and/or anomalous network activity. As discussed further below, the performance optimizing device 102 is configured to utilize a neural network, such as auto-encoding neural network, to reduce dimensionality of aggregated performance data including a plurality of captured network performance metrics for a plurality of network flows. In various embodiments, the plurality of network flows may include a variety of messages that may be carried according to any of a variety of protocols. In a preferred embodiment, the performance optimizing device 102 is configured to aggregate captured network performance data, to normalize the aggregated data in a parameter free way, to reduce dimensionality of the aggregated data and to generate one or more reduced-dimensional clusters of the normalized captured network performance data. The performance optimizing device 102 can be configured to reduce dimensionality of the aggregated data using, for example, a trained long short-term memory (LSTM)-based neural network. According to an embodiment of the present invention, the performance optimizing device 102 is also configured and operable to perform the entire host clustering process described below in either off-line or live mode by feeding/streaming a large number of network flows.

According to exemplary configuration illustrated in FIG. 1, the performance optimizing device 102 may be communicatively coupled to a Client Edge (CE) device 104. The CE device 104 can provide entry points into the protected enterprise core network 103. Example edge devices can include routers, routing switches, integrated access devices (IADs), multiplexers, and a variety of metropolitan area network (MAN) and wide area network (WAN) access devices. The CE device 104 can be deployed inline in one of several modes. In one example, the CE device 104 can be deployed as customer premises equipment (CPE) device in a branch that is capable of serving as a router. In some examples, the CE device 104 may comprise a gateway node. Generally, a gateway can be a network node equipped for interfacing with another network utilizing different communication protocols. In other words, the CE device 104 may serve, for example, as a data aggregation point linking multiple remote offices 108a, 108b, data center 110 and/or other components of the protected enterprise network 103. As shown in FIG. 1, a plurality of firewall security devices 106a-106c ("firewall" for short) may be coupled between the CE device 104 and various portions (i.e., remote office 108, data center 110) of the protected enterprise network 103. The firewall devices 106a-106c may be configured to prevent unauthorized users from accessing various hosts (i.e., DNS host 112) within the protected network 103.

In alternative configuration, the performance optimizing device 102 may comprise a virtual device. In other words, at least some of the embodiments do not require the performance optimizing device 102 to be a physical hardware device or to be located in a particular part of the network infrastructure, as long as the performance optimizing device 102 can be in the path of the incoming traffic to the protected network 103.

Figure 2:
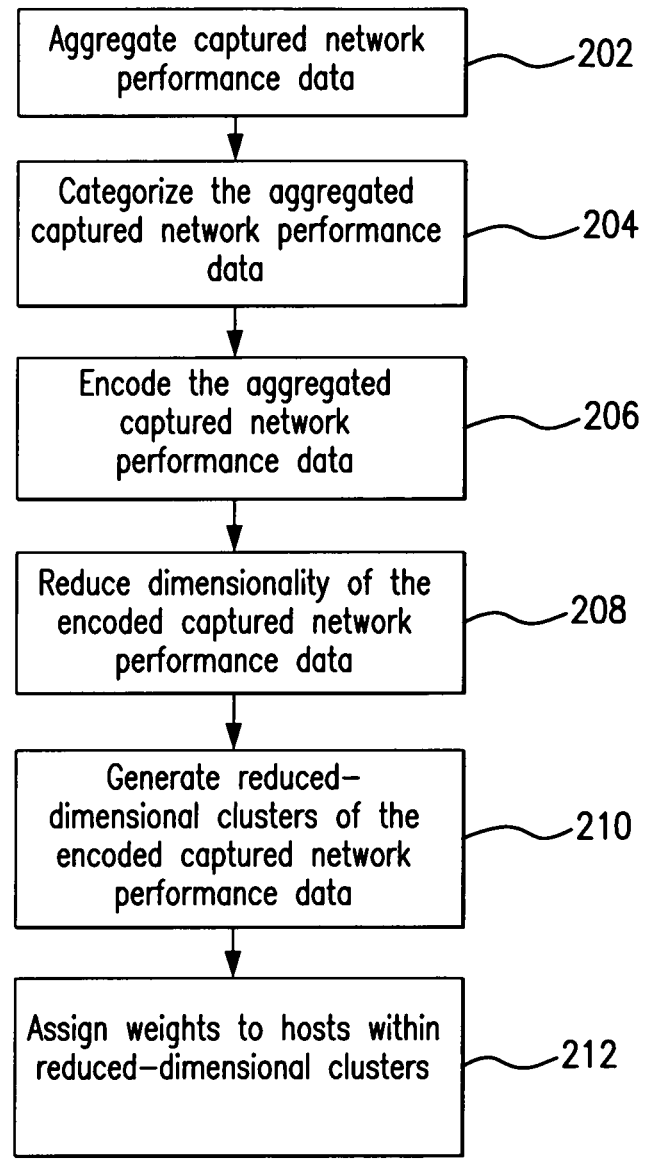
FIG. 2 is a flowchart illustrating operation of an embodiment of the present invention.

FIG. 2 is a flowchart illustrating operation of an embodiment of the present invention. Before turning to description of FIG. 2, it is noted that the flow diagram shown therein is described, by way of example, with reference to steps and/or elements shown in FIGS. 1, 3 and 4 although these operational steps may be carried out in any system and are not limited to the scenario shown in the aforementioned figure. Additionally, the flow diagram in FIG. 2 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

According to an embodiment of the present invention, at step 202, the performance optimizing device 102 aggregates captured network performance data. Large volumes of performance and log data may be captured as "events," wherein each event includes a collection of performance data and/or diagnostic information that is generated by a node and is correlated with a specific point in time. Events can be derived from "time-series event data," wherein time-series data comprises a sequence of data points (e.g., performance measurements from a node) that are associated with successive points in time and are typically spaced at uniform time intervals. More specifically, an event stream of time-series event data may be generated from network communications, such as network flows exchanged between the external devices 101 and the protected network 103, captured by a number of remote capture agents (e.g., network probes) deployed across the protected network 103, for example. Each one of the plurality of network flows is associated with a plurality of network hosts ("host nodes"). The remote capture agents may be installed on physical nodes and/or virtual machines on the network. Examples of the aggregated network performance data include but are not limited to, source/destination address, network flow duration, network flow start time, packet size, and the like At step 204, the performance optimizing device 102 categorizes the aggregated captured network performance data. For example, the performance optimizing device 102 may group the aggregated captured network performance data by source and/or destination IP addresses. As noted above, each element of the captured network performance data is associated with a specific network flow and is time dependent. The performance optimizing device 102 performs analysis of network behavior summarized by a slice of time; for example, a convenient slice length parameter might be 300 seconds. In other words, the performance optimizing device 102 may divide the captured network performance data into slices of a fixed interval. Further, at step 204, the performance optimizing device 102 may categorize each time slice. For example, the performance optimizing device 102 may evaluate a given metric associated with a particular time slice such as delay, loss, and jitter, or device load, utilization and/or other performance metrics and may determine whether the evaluated metric belongs to either discrete data or continuous data categories.

In one embodiment, quantifiable network performance data (also referred to herein as metadata) constituents are compared to ascertain discrete metadata constituents. Discrete metadata constituents are those data elements that are of the same category, for example discrete metadata may include protocol numbers, port numbers and the like, while continuous metadata may include packet size, flow duration, and the like. Whether data is of the same category may be determined definitionally rather than substantively, for example, through the use of a relational glossary found in a relational database 430. Both continuous and discrete metadata may be normalized on a time-slice basis as described below.

According to an embodiment of the present invention, at step 206, the performance optimizing device 102 encodes the aggregated captured network performance data (metadata). In other words, the performance optimizing device 102 encodes each set of the aggregated time slices to generate encoded data slices in accordance with embodiments of the present invention. In one embodiment, the performance optimizing device 102 is configured to encode a variety of different data categories of the aggregated captured network performance data by employing different data modification functions to different data categories. In one embodiment, at step 206, the performance optimizing device 102 summarizes discrete metadata by using entropy modification function for a particular piece of metadata over a particular fixed interval time-slice. The entropy modification function may include Shannon's entropy function. It will be appreciated that mathematical formula 302 (see FIG. 3) is described in terms of Shannon's entropy, rather than similarity-adjusted entropy, though the formula can be easily modified to use the latter measure of entropy instead.

Figure 3:
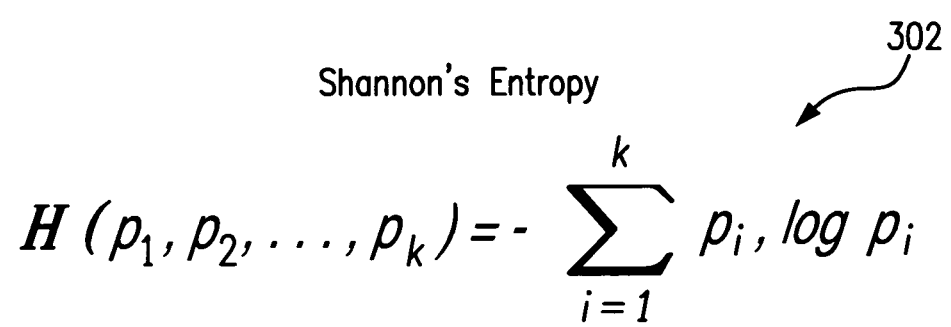
FIG. 3 shows mathematical formula related to Shannon's entropy, in accordance with an example embodiment.

FIG. 3 shows mathematical formula related to Shannon's entropy, in accordance with an example embodiment. Shown in FIG. 3 is mathematical formula 302, which describes Shannon's entropy. As used in this formula, H is Shannon's entropy and it is a function of probabilities $p_1$ through $p_k$, more specifically, the negative summation from i equal 1 through k of ($p_i \cdot \log (p_i)$). In an example embodiment, the base of the log function might be 2, Euler's number e, 10, or any other suitable base.

Further, in one embodiment, at step 206, the performance optimizing device 102 summarizes continuous metadata by applying logarithm modification function for a particular piece of continuous metadata over a particular fixed interval time-slice. In an example embodiment, the base of the log function again might be 2, Euler's number e, 10, or any other suitable base. Advantageously, employing different data modification functions to different data categories ensures that individual pieces of the aggregated captured data can be adequately normalized by dividing various captured data (e.g., measurements) by carefully selected fixed constants. The selected fixed constants enable compression/transformation of data into ranges of interest. For example, division by corresponding constants can convert network performance measurements from seconds to hours, from hours to days, and so on.

At step 208, the performance optimizing device 102 reduces dimensionality of the encoded captured network performance data by utilizing auto-encoder technique. In certain examples, an auto-encoder technique provides unsupervised learning of efficient codings, such as in an artificial neural network. In one example of reducing dimensionality, auto-encoding neural networks may wrap dimensionality reduction into the encoding/transformation step itself. Using an auto-encoder technique, a representation or encoding can be learned for a set of aggregated captured network performance data. Auto-encoding can be used to learn a model of data and/or other dimensionality reduction using an encoder and decoder to process the data to construct layers (including hidden layers) and connections between layers to form the neural network.

In one embodiment, an auto-encoding neural network may comprise a LSTM based neural network. Standard LSTM unit typically comprises an input gate, memory gate (forget gate), output gate, and the like. The outputs for each individual LSTM units are calculated using the following formulas:

$$i_t = \text{sigmoid}(W_i^*[c_{t-1}, h_{t-1}, x_t] + b_i) \quad (1)$$

$$f_t = \text{sigmoid}(W_f^*[C_{t-1}, h_{t-1}, x_t] + b_f) \quad (2)$$

$$o_t = \text{sigmoid}(W_o^*[C_{t-1}, h_{t-1}, x_t] + b_0) \quad (3)$$

$$c_t = f_t^* c_{t-1} + i_t^* \tan h(W_c^*[ht_{-1}, x_t]) \quad (4)$$

$$h_t = o_t^* \tan h(c_t) \quad (5)$$

where $i_t$ represents an input gate, $f_t$ represents a forget gate, $o_t$ represents an output gate, $c_t$ represents memory from current block, $h_t$ represents output of the current block, $W_i$, $W_f$, $W_o$, represent weights and $b_i$, $b_f$ and b represent biases associated with different layers within each LSTM cell. LSTM algorithm provides readily available frameworks which allow for efficient implementation on powerful graphics processing units (GPUs). In various embodiments, the auto-encoding neural network may be trained in either off-line mode or live mode.

In one example of reducing dimensionality, Principal Component Analysis (PCA) may be used by the performance optimizing device 102 at step 208. PCA is useful for determining orthogonal bases using different unconditional prior scenarios. In particular, PCA involves a mathematical procedure that transforms a number of possibly correlated variables into a number of uncorrelated variables called principal components, which are related to the original variables by an orthogonal transformation (i.e. covariance-based).

In the present context, PCA includes finding an orthogonal base of the experimental covariance matrix estimated with these prior scenarios, and then selecting a subset of the most important eigenvalues and associated eigenvectors that are used as a reduced model space base. The resulting transformation is such that the first principal component accounts for as much of the variability and each succeeding component accounts for as much of the remaining variability as possible.

In yet another example of reducing dimensionality, when more than three non-trivial principal components exist there may be more appropriate techniques for dimensionality reduction that represent the local structure of high-dimensional data. For example, the performance optimizing device 102 may utilize a method for dimensionality reduction known as t-distributed Stochastic Neighbor Embedding (t-SNE) in step 208. The t-SNE algorithm can minimize the Kullback-Leibler (KL) divergence between the joint probability distribution P in the high dimensional data and the joint probability distribution Q in the low dimensional data.

In an embodiment, at step 210, the performance optimizing device 102 may be configured to generate a plurality of clusters grouping together hosts associated with various captured network performance metrics including, for example, network performance metrics having known categories. Clustering refers to assigning data items (e.g., hosts) into groups ("clusters") based on factors such as data value similarity, data set divisibility, data set density, and application-specific requirement. Similarity clustering entails comparing data items to each other along one or more dimensions, and possibly assigning similar data items to the same group. For example, the performance optimizing device 102 may generate clusters of hosts associated with a particular department or team. Alternately and/or additionally, the performance optimizing device 102 may generate clusters of hosts demonstrating a particular behavior associated with specific types of malware such as adware, ransomware, bots, bugs, rootkits, spyware, Trojan horses, viruses, worms, and/or the like. The performance optimizing device 102 may cluster the hosts by at least applying one or more clustering techniques including, for example, density-based clustering (e.g., density-based spatial clustering of applications with noise (DBSCAN), hierarchical density-based spatial clustering of applications with noise (HDB-SCAN)) and centroid-based clustering (e.g., k-nearest neighbor clustering, k-means clustering). A plurality of hosts associated with a variety of network flows may be clustered based on the network performance data, such as average network flow duration, average number of bytes included in network flows, etc. associated with each host. In doing so, the performance optimizing device 102 may generate clusters that group same and/or similar hosts, which may be associated with network performance data having the same and/or similar classification.

In some embodiments, the performance optimizing device 102 may calculate a centroid value for each cluster. This can speed the clustering step (step 210), as each data item (e.g., host) is compared only with the cluster centroids, rather than with all the data items themselves (a larger number). Nevertheless, when no fixed limit is placed on the number of clusters, centroid methods for clustering still have O ($n^2$) time complexity, as the number of computational steps required per data item grows with the number of data items added.

According to an embodiment of the present invention, at step 212, the performance optimizing device 102 may assign one or more weights to hosts within reduced-dimensional clusters. The assigned weight is indicative of the performance of the corresponding host as compared to other hosts included within the reduced-dimensional cluster. In other words, the assigned weight can be used to track dynamic changes in the similarity of a host to its peers exhibited over time.

Figure 4:
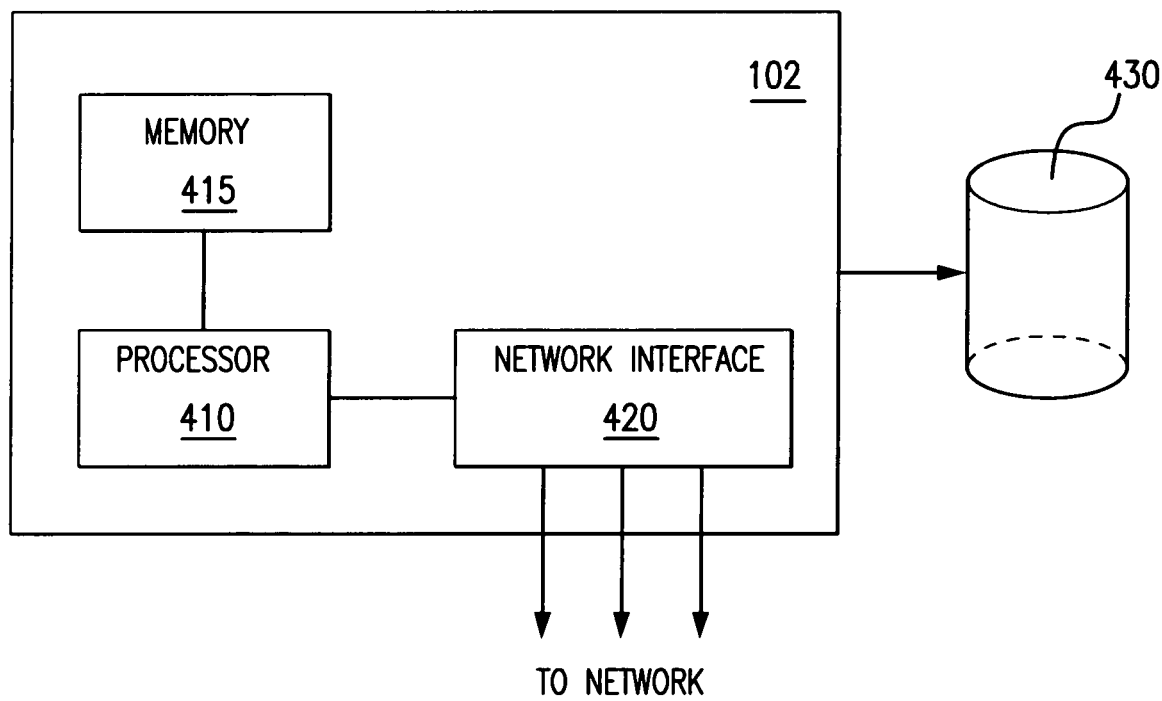
FIG. 4 illustrates external and internal components of system computers of FIG. 1 in accordance with an illustrative embodiment of the present invention.

With reference now to FIG. 4, illustrated is an exemplary and non-limiting block diagram of the performance optimizing device 102 constructed according to an illustrated embodiment. The performance optimizing device 102 is communicatively coupled to the protected network 103 and to the database 430 (i.e., training database of valid network performance data), as shown in FIG. 4, and is at least configured to execute the method for clustering various hosts based on network metadata as described in greater detail above. The performance optimizing device 102 preferably includes a processor 410 coupled to a memory 415 and a network-interface module 420. The network-interface module 420 allows the communication with the protected network 103. The processor 410 uses instructions stored in the memory 415 to execute performance analysis optimizing tasks as well as to control and enable the operation of the network-interface module 420.

In summary, as new captured network performance data is aggregated, the utilization of auto-encoder technique for dimensionality reduction and density-based clustering technique (such as HDBSCAN) enables the performance optimizing device 102 to efficiently generate cluster labels and cohort similarity values for the source host, even for the very first observation of that particular host. Advantageously, by application of different data modification functions to different categories of the aggregated captured network performance data and by employment of non-parametric normalization (e.g., by using constant divisors), embodiments of the present invention provide scalable application of dimensionality reduction and/or clustering techniques. In a novel combination, these techniques disclosed by various embodiments of the present invention reduce the amount of necessary storage to arbitrarily small amounts by selecting arbitrarily small fixed time-slices to aggregate the captured data.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing performance analysis of a plurality of network hosts associated with a communications network, the method comprising steps of:
   aggregating captured network performance data comprising a plurality of captured network performance metrics for a plurality of network flows, each one of the plurality of network flows associated with a plurality of network hosts;
   categorizing the plurality of captured network performance metrics into two or more categories wherein the aggregated captured network performance data is determined to be in one of the two or more categories based upon utilization of a relational database wherein both continuous metadata and discrete metadata contained in the aggregated captured network performance data is normalized on a time-slice basis, wherein the continuous metadata and the discrete metadata are quantifiable network performance data, wherein the continuous metadata includes at least one of packet size and flow duration, wherein the discrete metadata includes data elements that are of a same category, and includes at least one of protocol numbers and port numbers;
   encoding the aggregated captured network performance data by employing at least one data modification function including encoding a plurality of different data categories of the aggregated captured network performance data with different data modification functions relative to different data categories, wherein the encoding includes summarizing the discrete metadata by using Shannon's entropy function for a particular piece of metadata over a particular fixed interval time-slice;
   reducing dimensionality of the encoded aggregated captured network performance data using a neural network model; and
   generating one or more reduced-dimensional clusters of the encoded aggregated captured network performance data, each of the one or more reduced-dimensional clusters grouping one or more hosts of the plurality of network hosts based on the captured network performance metrics, wherein the grouping includes assigning the plurality of network hosts into groups based on factors including one or more of data value similarity, data set divisibility, and data set density, wherein the grouping of the plurality of network hosts are associated with network performance data having a same classification.

2. The method of claim 1, wherein the at least one data modification function comprises entropy modification function.

3. The method of claim 1, wherein the at least one data modification function comprises logarithmic modification function.

4. The method of claim 1, wherein the neural network comprises a Long Short-Term Memory LSTM-based recurrent neural network.

5. The method of claim 1, further comprising assigning one or more weights to each host within the reduced-dimensional cluster, wherein the assigned weight is indicative of the performance of the corresponding host as compared to other hosts included within the reduced-dimensional cluster.

6. The method of claim 1, wherein the captured network performance data comprises time series data, wherein aggregating the captured network performance data comprises aggregating the plurality of captured network performance metrics for each of the plurality of network flows on a time-slice basis and wherein encoding the aggregated captured network performance data comprises encoding each of aggregated time slices.

7. The method of claim 1, wherein the one or more reduced-dimensional clusters are generated using Density-Based Spatial Clustering of Applications with Noise (DB-SCAN) clustering method.

8. A system for optimizing performance analysis of a plurality of network hosts associated with a communications network, the system comprising:
a processor and a memory coupled to the processor, the memory containing a set of instructions that, when executed by the processor, cause the processor to:
aggregate captured network performance data comprising a plurality of captured network performance metrics for a plurality of network flows, each one of the plurality of network flows associated with a plurality of network hosts;
categorize the plurality of captured network performance metrics into two or more categories wherein the aggregated captured network performance data is determined to be in one of the two or more categories based upon utilization of a relational database wherein both continuous metadata and discrete metadata contained in the aggregated captured network performance data is normalized on a time-slice basis, wherein the continuous metadata and the discrete metadata are quantifiable network performance data, wherein the continuous metadata includes at least one of packet size and flow duration, wherein the discrete metadata includes data elements that are of a same category, and includes at least one of protocol numbers and port numbers;
encode the aggregated captured network performance data by employing at least one data modification function including encoding a plurality of different data categories of the aggregated captured network performance data with different data modification functions relative to different data categories, wherein the encoding includes summarizing the discrete metadata by using Shannon's entropy function for a particular piece of metadata over a particular fixed interval time-slice;
reduce dimensionality of the encoded aggregated captured network performance data using a neural network model; and
generate one or more reduced-dimensional clusters of the encoded aggregated captured network performance data, each of the one or more reduced-dimensional clusters grouping one or more hosts of the plurality of network hosts based on the captured network performance metrics, wherein the grouping includes assigning the plurality of network hosts into groups based on factors including one or more of data value similarity, data set divisibility, and data set density, wherein the grouping of the plurality of network hosts are associated with network performance data having a same classification.

9. The system of claim 8, wherein the at least one data modification function comprises entropy modification function.

10. The system of claim 8, wherein the at least one data modification function comprises logarithmic modification function.

11. The system of claim 8, wherein the neural network comprises a Long Short-Term Memory LSTM-based recurrent neural network.

12. The system of claim 8, wherein the set of instructions that, when executed by the processor, further cause the processor to assign one or more weights to each host within the reduced-dimensional cluster, wherein the assigned weight is indicative of the performance of the corresponding host as compared to other hosts included within the reduced-dimensional cluster.

13. The system of claim 8, wherein the captured network performance data comprises time series data, wherein the set of instructions to aggregate the captured network performance data further cause the processor to aggregate the plurality of captured network performance metrics for each of the plurality of network flows on a time-slice basis and wherein the set of instructions to encode the aggregated captured network performance data further cause the processor to encode each of aggregated time slices.

14. The system of claim 8, wherein the one or more reduced-dimensional clusters are generated using Density-Based Spatial Clustering of Applications with Noise (DB-SCAN) clustering method.

15. A tangible, non-transitory, computer-readable media having software encoded thereon, the software, when executed by a processor, operable to:
aggregate captured network performance data comprising a plurality of captured network performance metrics for a plurality of network flows, each one of the plurality of network flows associated with a plurality of network hosts;
categorize the plurality of captured network performance metrics into two or more categories wherein the aggregated captured network performance data is determined to be in one of the two or more categories based upon utilization of a relational database wherein both continuous metadata and discrete metadata contained in the aggregated captured network performance data is normalized on a time-slice basis, wherein the continuous metadata and the discrete metadata are quantifiable network performance data, wherein the continuous metadata includes at least one of packet size and flow duration, wherein the discrete metadata includes data elements that are of a same category, and includes at least one of protocol numbers and port numbers;
encode the aggregated captured network performance data by employing at least one data modification function including encoding a plurality of different data categories of the aggregated captured network performance data with different data modification functions relative to different data categories, wherein the encoding includes summarizing the discrete metadata by using Shannon's entropy function for a particular piece of metadata over a particular fixed interval time-slice;

reduce dimensionality of the encoded aggregated captured network performance data using a neural network model; and generate one or more reduced-dimensional clusters of the encoded aggregated captured network performance data, each of the one or more reduced-dimensional clusters grouping one or more hosts of the plurality of network hosts based on the captured network performance metrics, wherein the grouping includes assigning the plurality of network hosts into groups based on factors including one or more of data value similarity, data set divisibility, and data set density, wherein the grouping of the plurality of network hosts are associated with network performance data having a same classification.

16. The tangible, non-transitory, computer-readable media of claim 15, wherein the at least one data modification function comprises entropy modification function.

17. The tangible, non-transitory, computer-readable media of claim 15, wherein the at least one data modification function comprises logarithmic modification function.

* * * * *